//

3,795,588
PROCESS FOR SEPARATING HYDROCARBON MIXTURES COMPRISING PARAFFINS, MONO-OLEFINS, DIOLEFINS AND SMALL AMOUNTS OF MORE HIGHLY UNSATURATED HYDROCARBONS BY EXTRACTIVE DISTILLATION

Gerhard Preusser, Essen, Martin Schulze, Neviges, and Klaus Richter, Essen, Germany, assignors to Heinrich Koppers Gesellschaft mit beschrankter Haftung, Essen, Germany
Filed Mar. 27, 1970, Ser. No. 23,302
Claims priority, application Germany, Mar. 29, 1969, P 19 16 255.1
Int. Cl. C07c 7/08
U.S. Cl. 203—25   11 Claims

ABSTRACT OF THE DISCLOSURE

Process for separating hydrocarbon mixtures composed of paraffins, monoolefins, diolefins and small amounts of more highly unsaturated hydrocarbons by extractive distillation in which the diolefins together with the selective solvent are taken off from the sump of the extractive distillation column characterized in that morpholine and/or substituted morpholine is used as the selective solvent.

---

Figure 1:
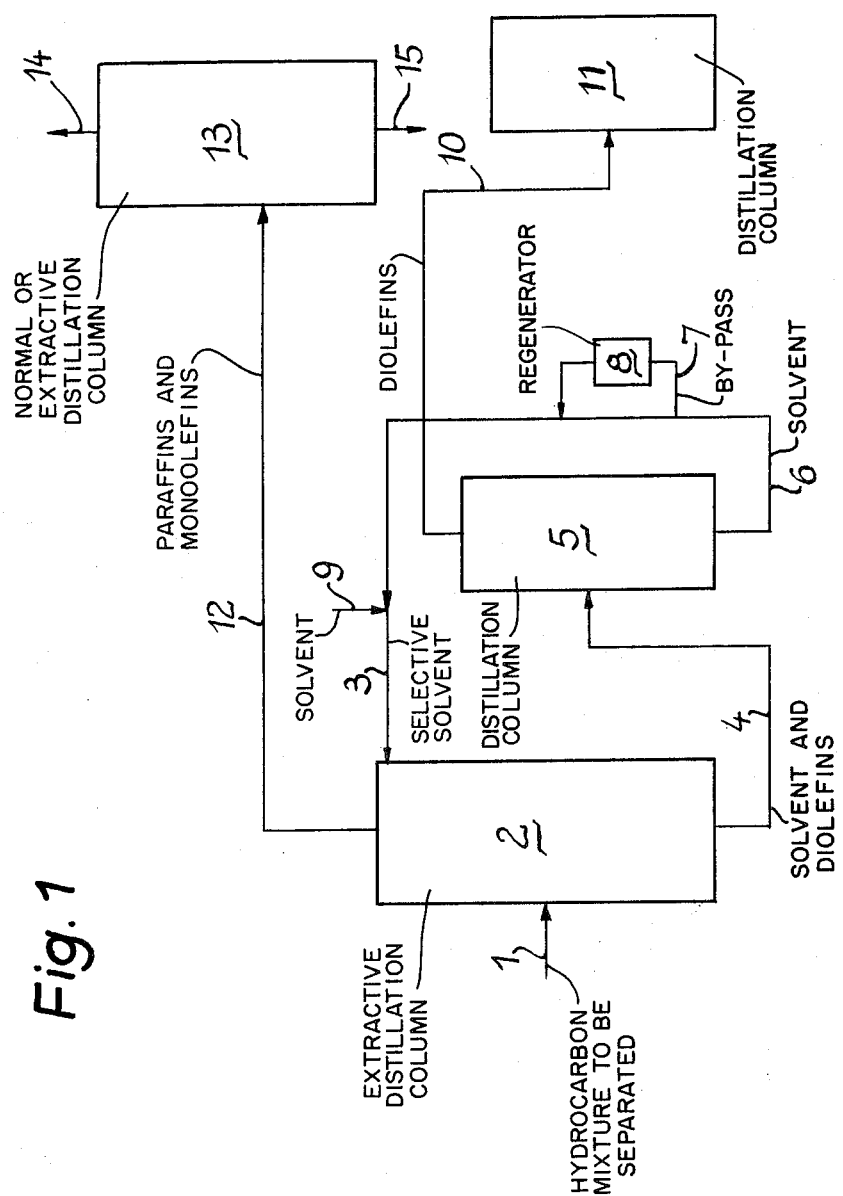

The instant invention relates to an improvement in the process for separating hydrocarbon mixtures composed of paraffins, monoolefins, diolefins and small amounts of more highly unsaturated hydrocarbons such as triolefins and acetylene, by extractive distillation in which the diolefins together with the selective solvent are taken off from the sump of the extractive distillation column.

In German Auslegeschrift No. 1,211,738, an extractive distillation process has been described for separating $C_5$ hydrocarbon mixtures containing paraffins, monoolefins and diolefins. The process described utilizes as the selective solvent for the extractive distillation N-methyl-pyrrolidone. The latter provides a relatively satisfactory separation result. However, under the conditions of the extractive distillation, there takes place a decomposition giving rise in the main to acid decomposition products which in turn results in a corrosion of the parts of the equipment which comes into contact with the solvent. This same result has been observed when other pyrrolidone derivatives are used.

In order to remove the impurities formed as decomposition products, the same together with the selective solvent must be removed from the sump of the extractive distillation column and the mixture subjected to treatment for recovery of the solvent. This can only be carried out by economically unsatisfactory procedures.

It is an object of this invention to provide a process for separating hydrocarbon mixtures composed of paraffins, monoolefins, diolefins and small amounts of more highly unsaturated hydrocarbons which avoids the disadvantages of the known procedures.

Another object of this invention is to provide a process for separating hydrocarbon mixtures composed of paraffins, monoolefins, diolefins and small amounts of more highly unsaturated hydrocarbons by means of extractive distillation wherein corrosion of the equipment involved is not observed.

Still another object of this invention is to provide a process for separating hydrocarbon mixtures composed of paraffins, monoolefins, diolefins and small amounts of more highly unsaturated hydrocarbons utilizing a solvent having an improved selectivity as compared to the solvents previously utilized.

These and other objects and advantages of the invention are realized by an extractive distillation procedure wherein the diolefins in admixture with the selective solvent are taken off from the sump of the extractive distillation column, and wherein as the selective solvent there is utilized morpholine and/or substituted morpholine.

The substituted morpholines can have a substituent containing from 1 to 7 carbon atoms. Illustrative examples of suitable solvents include N-formyl-2,6-dimethylmorpholine, N - formylmorpholine, N - oxyethyl-morpholine, N-acetylmorpholine and N-phenyl-morpholine. The substituent can be straight or branched chained or of cyclic structure. In addition the substituents can contain hetero atoms adjacent C-atoms.

It is also possible to utilize substituted morpholines, the substituents of which contain only heteroatoms, i.e., contain no carbon atoms. An example of the latter is nitrosomorpholine.

Further, the solvents may be used singly or in mixtures thereof whereby the single components are selected with a view to their melting and boiling points resulting in a mixture suitable for the intended purpose. Particularly preferred solvents are the N-substituted morpholines.

The solvents used in accordance with the invention are characterized by their decreased tendency to undergo decomposition. If decomposition does take place, the decomposition products are not acids but rather are bases which are not corrosive to the apparatus.

The process of the invention is advantageously carried by conducting the extractive distillation without external hydrocarbon reflux. This method of operation was not to have been considered as desirable in that from the artisan's knowledge of distillation techniques, it was to have been expected that the sharpness of the separation in a column is increased directly with an increase in the reflux ratio. Experiments carried out by the applicants herein have established that this is not the situation in the extractive distillation in accordance with the invention and this is for the following reasons:

(1) Through the return flow of the reflux in the extractive distillation column, the charged solvent is diluted and therewith its selectivity is reduced.

(2) The reflux reintroduced into the extractive distillation column must be re-evaporated requiring an increase in the energy required to be supplied. As a result, there is an increase in the sump temperature of the extractive distillation column. This gives rise to a re-evaporation of larger amounts of the diolefin present in the sump. As the diolefin vapors have a correspondingly higher temperature, they rise correspondingly higher in the column before they are condensed. This results in an undesirable mixing of the solvent with the reflux which in turn disadvantageously affects the separation.

(3) Because of the increased heating and the re-evaporation of the sump product, the residence time of the diolefins in the sump is increased and therewith the harmful effect of increased temperatures manifested. The tendency of these compounds to undergo polymerization is thereby further increased. The polymerizates thereby formed give rise to foaming in the extractive distillation column which very adversely interferes with the separation.

The hydrocarbon separation process in accordance with the invention can be conducted so that the extractive distillation is carried out under increased pressure as well as at normal pressure. In certain cases, the extractive distillation can also be carried out under decreased pressure, i.e., vacuum. Through the use of vacuum, the sump temperature of the extractive distillation column is lowered and therewith the tendency of the diolefins to undergo polymerization in the sump decreased.

For carrying out the process of the invention, there can be advantageously used two different installations which are further illustrated in the drawings forming a part of this disclosure.

In the installation shown in FIG. 1, the hydrocarbon mixture to be separated is introduced via conduit 1 into the extractive distillation column 2 at the level of the plate located at about the midpoint of the column. The hydrocarbon mixture before its introduction into the column is heated to almost its boiling point so that on its entry into the extractive distillation column, it is vaporized. It is also possible to introduce the hydrocarbon mixture already in vapor form into the column. The selective solvent is introduced via conduit 3 into the top of the column and it then flows downwardly over the trays in the column while taking up the vapor form diolefins. The mixture of solvent and diolefins is collected in the sump of the extractive distillation column and from here the mixture is delivered via conduit 4 into the distillation column 5 in which a further separation of diolefins and solvent takes place. The solvent is taken off via conduit 6 from the sump of distillation column 5 and via conduit 6 which leads into conduits returned into the circulation. In conduit 6, there is preferably arranged a bypass 7 which includes a regeneration apparatus 8, through which a part of the solvent is diverted for being regenerated. The conduit 9 is provided for the introduction of fresh solvent into the process. The diolefins and also advantageously the strongly unsaturated hydrocarbons are taken off at the top of the distillation column 5 through the line 10 and from there introduced into the distillation column 11 for further separation. Simultaneously, the paraffins and monoolefins in vapor form are taken off at the head of column 2 and transferred through line 12 into column 13, in which their further separation is carried out. Column 13 can be constructed as a normal distillation column or as an extractive distillation column. If it is desired to separate the paraffin-monoolefin mixture in column 13 by a single temperature cut, then the column 13 is advantageously a normal or ordinary distillation column. If, on the other hand, it is desired to carry out a quantitative separation of the paraffins and monoolefins in column 13, then the column is advantageously constructed as an extractive distillation column. The arrows 14 and 15 designate the discharge lines for the different fractions.

Figure 2:
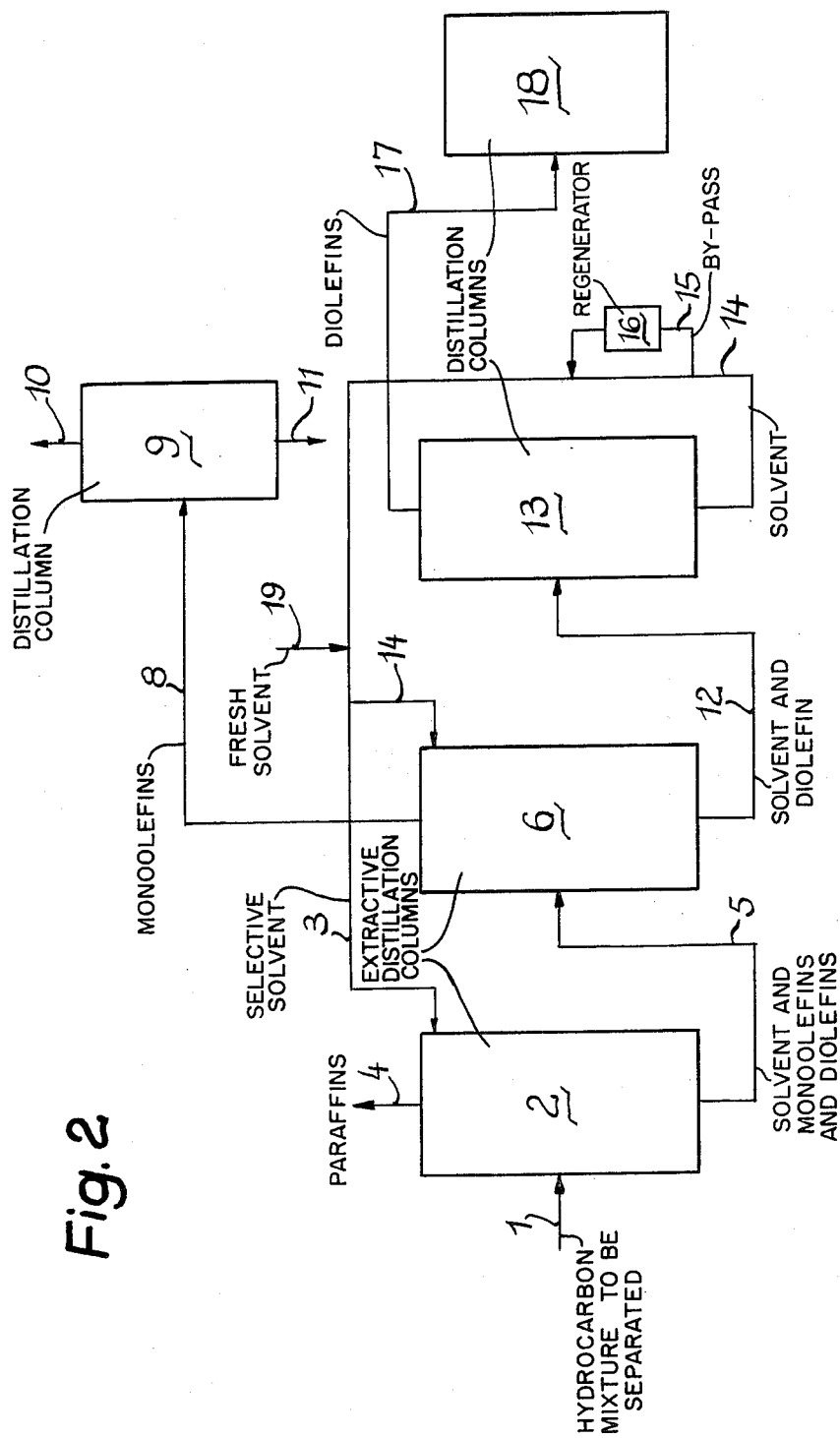

The installation shown in FIG. 2 involves an arrangement of two extractive distillation columns arranged one after the other. The mixture of hydrocarbons to be separated is supplied via conduit 1 into the plate equipped extractive distillation column 2. The selective solvent is introduced via line 3 into the top of the column. Column 2 is in this embodiment operated under conditions whereby there is taken off via conduit 4 only the paraffins, only very small amounts of olefins being admixed therewith. The sump product of extractive distillation column 2 contains in addition to the solvent, the mono- and diolefins as well as the more highly unsaturated hydrocarbons. This sump product is led via conduit 5 into the second extractive distillation column 6 where the further separation takes place. The monoolefins escape from the column at the top thereof and are fed via line 8 into distillation column 9, in which a still further separation takes place. The arrows 10 and 11 serve to indicate discharge lines for the separated fractions. At the same time, a product is taken off from the sump of extractive distillation column 6 which comprises solvent, diolefins and the higher unsaturates. This sump product is delivered through line 12 into the distillation column 13 wherein a further separation follows. The solvent is thereby recovered from the sump of distillation column 13 and recycled into the head of extractive distillation column 6 via line 14. The line 3 branches off from the line 14 and via the branch 3 solvent can be conducted into the top of extractive distillation column 2. A bypass 15 can further be provided in line 14, which bypass is provided with a regeneration apparatus 16 in which a part of the solvent can be regenerated. The diolefins as well as the more highly unsaturated hydrocarbons can be removed at the head of distillation column 13 by means of takeoff conduit 17. The further separation of this fraction advantageously takes place in distillation column 18. Additional fresh solvent can be introduced as needed into the process via line 19.

In accordance with the known heating techniques, the vapors of an after arranged column can be used to either partially or totally heat a preceding column.

The following examples are given for the purpose of further illustrating the invention, but the same are not to be construed as limiting the same in any way.

EXAMPLE 1

This example serves to illustrate the separation of a $C_5$ cut of a pyrolysis product utilizing the installation as shown in FIG. 1. The analysis of the starting mixture in conduit 1, of the head product of the extractive distillation in line 12 (paraffin-monoolefin fraction) and of the diolefin fraction in line 10, have been included in Table I which follows.

TABLE I

|  | Weight percent | | |
| --- | --- | --- | --- |
|  | Analysis of the starting mixture in line 1 | Head product in line 12 | Diolefin fraction in line 10 |
| Isopentane | 12.94 | 19.1 |  |
| n-Pentane | 20.22 | 29.8 |  |
| Cyclopentane | 1.18 | 0.9 |  |
| Pentene 1 | 5.38 | 7.9 | 1.87 |
| cis-Pentene 2 | 2.82 | 5.1 |  |
| trans-Pentene 2 | 8.46 | 11.5 |  |
| 2-Methylbutene 1 | 12.21 | 17.5 | 0.04 |
| 2-Methylbutene 2 | 5.12 | 8.1 | 0.07 |
| Cyclopentene | 2.01 | 0.12 | 5.4 |
| Isoprene | 16.90 | 0.13 | 52.9 |
| trans-Pentadiene 1.3 | 4.44 | <0.10 | 13.7 |
| cis-Pentadiene 1.3 | 1.95 | <0.10 | 6.1 |
| Cyclopentadiene | 6.38 | <0.10 | 19.9 |

The separation was conducted under the following conditions.

Solvent:
    71 weight percent N-hydroxyethyl morpholine
    29 weight percent 2,6-dimethyl N-formylmorpholine
Amount of starting mixture through line 1: 27 kg.
Introduction temperature: 18° C.
Amount of solvent through line 3: 110 kg.
Introduction temperature line 3: 23° C.
Head temperature column 2: 51° C.
Sump temperature column 2: 94° C.
Pressure in column 2: 0.5 atm.
Amount of paraffin and olefin through line 12: 18.2 kg.
Head temperature column 5: 39° C.
Sump temperature column 5: 148° C.
Pressure in column 5: Normal
Amount of diolefin through line 10: 8.7 kg.

EXAMPLE 2

This example illustrates the separation of a $C_4$ cut of a pyrolysis product utilizing for the separation, the installation shown in FIG. 2. The analysis of the starting mixture in line 1, the paraffin fraction in line 4, the monoolefin fraction in line 8 and of the diolefin fraction in line 17, are included in Table II which follows.

TABLE II

|  | Weight percent | | | |
| --- | --- | --- | --- | --- |
|  | Analysis of starting mixture in line 1 | Paraffin fraction in line 4 | Monoolefin fraction in line 8 | Diolefin fraction in line 7 |
| $C_3KW$ | 0.24 | 6.52 |  |  |
| Iso-butane | 0.97 | 27.42 | 0.1 |  |
| n-Butane | 2.06 | 58.13 |  |  |
| Iso-butene | 20.92 | 3.32 | 35.98 | 0.12 |
| Butene-1 | 26.24 | 3.21 | 45.22 | 0.12 |
| Butene-2 | 10.16 | 1.27 | 17.55 | <0.1 |
| Butadiene-1,3 | 39.41 | 0.13 | 1.25 | 99.7 |

The separation was carried out under the following conditions.

Solvent: N-acetylmorpholine
Amount of starting mixture in line 1: 43 kg.
Introduction temperature: 20° C.
Amount of solvent through line 3: 125 kg.
Temperature of solvent in line 3: 21° C.
Head temperature column 2: 43° C.
Sump temperature column 2: 65° C.
Pressure in column 2: 6 atm.
Amount of paraffin through line 4: 1.53 kg.
Amount through line 5: 41.47 kg.
Amount of solvent through line 14: 60 kg.
Temperature of solvent in line 14: 20° C.
Head temperature column 6: 43° C.
Sump temperature column 6: 110° C.
Pressure in column 6: 6 atm.
Amount of monoolefin through line 8: 24.78 kg.
Amount through line 12: 201.67 kg.
Head temperature column 13: 38° C.
Sump temperature column 13: 175° C.
Pressure in column 13: 5 atm.
Amount of diolefin through line 17: 16.71 kg.

In both examples, the solvent did not produce any evidence of corrosion in the equipment even after many months of operation.

Without further analysis, the foregoing will so fully reveal the gist of the present invention, that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. Process for the separation and recovery of diolefins from $C_4$–$C_5$ hydrocarbon mixtures consisting of paraffins, diolefins, monoolefins and small amount of more highly unsaturated hydrocarbons comprising subjecting said mixture in the presence of a selective solvent for the diolefins to an extractive distillation in a distillation column at a temperature which is in the head portion of said column lower than the vaporization temperature of said diolefins at the pressure within said column, said selective solvent being selected from the group consisting of morpholine, substituted morpholine and mixtures thereof so as to obtain a sump product consisting predominantly of said diolefins dissolved in said selected solvent and a head product consisting predominantly of paraffins and monoolefins; separating said diolefins in said sump product from said selective solvent; and recovering said separated diolefins.

2. Process according to claim 1 wherein in admixture with the diolefins and selective solvent, the monolefins are also withdrawn from the sump of the extractive distillation column and the withdrawn sump product introduced into a subsequently arranged second extractive distillation column for separation into monoolefin, diolefin and selective solvent fractions.

3. Process according to claim 1 which comprises carrying out the extractive distillation without any external hydrocarbon reflux.

4. Process according to claim 1 which comprises carrying out said extractive distillation under elevated pressure.

5. Process according to claim 1 which comprises carrying out said extractive distillation under normal pressure.

6. Process according to claim 1 which comprises carrying out said extractive distillation under decreased pressure.

7. Process according to claim 1 which comprises utilizing the heat of the vapors of a subsequently arranged column to heat a preceeding column.

8. Process according to claim 1 wherein the substituent of said substituted morpholine contains from 1 to 7 carbon atoms.

9. Process according to claim 1 wherein the substituent of said substituted morpholine contains only heteroatoms.

10. Process according to claim 1 wherein said solvent comprises a mixture of substituted morpholines.

11. Process according to claim 1 wherein said solvent is at least one N-substituted morpholine.

References Cited

UNITED STATES PATENTS

| | | | |
|---|---|---|---|
| 3,434,936 | 3/1969 | Luther et al. | 203—58 |
| 3,378,465 | 4/1968 | Brandt et al. | 203—25 |
| 2,251,773 | 8/1941 | Agruss et al. | 208—326 |
| 2,357,667 | 9/1944 | Kuhn | 208—326 |
| 3,320,138 | 5/1967 | Brandt et al. | 203—58 |
| 2,555,650 | 6/1951 | Lake | 203—58 |
| 2,465,715 | 3/1949 | Engel | 203—58 |
| 3,262,875 | 7/1966 | Girotti et al. | 208—326 |
| 3,325,399 | 6/1967 | Cinelli et al. | 208—326 |
| 2,771,494 | 11/1956 | Weedman | 203—58 |

OTHER REFERENCES

Technique of Organic Chemistry, vol. IV, Distillation, Weissberger, Interscience Publ., Inc., New York, 1251, p. 338 (Carlson).

WILBUR L. BASCOMB, Jr., Primary Examiner

U.S. Cl. X.R.

203—73, 58; 208—326; 260—681.5 R